United States Patent
Hui et al.

(10) Patent No.: US 9,692,644 B2
(45) Date of Patent: Jun. 27, 2017

(54) DYNAMICALLY ADJUSTING NETWORK PARAMETERS USING WEATHER FORECASTS

(71) Applicant: Cisco Technology, Inc., San Jose, CA (US)

(72) Inventors: Jonathan W. Hui, Belmont, CA (US); Wei Hong, Berkeley, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 692 days.

(21) Appl. No.: 13/920,720

(22) Filed: Jun. 18, 2013

(65) Prior Publication Data

US 2014/0372577 A1    Dec. 18, 2014

(51) Int. Cl.
  *G06F 15/16* (2006.01)
  *H04L 12/24* (2006.01)
  *H04L 29/08* (2006.01)
  *H04W 40/18* (2009.01)

(52) U.S. Cl.
  CPC ...... *H04L 41/0816* (2013.01); *H04L 41/0836* (2013.01); *H04L 41/147* (2013.01); *H04L 67/12* (2013.01); *H04W 40/18* (2013.01); *Y04S 40/162* (2013.01)

(58) Field of Classification Search
  CPC ............. H04L 41/0816; H04L 41/0836; H04L 41/147; H04W 40/18
  USPC ........................................................ 709/221
  See application file for complete search history.

(56) References Cited

U.S. PATENT DOCUMENTS

| | | |
|---|---|---|
| 2006/0028376 A1 | 2/2006 | Theobold et al. |
| 2010/0073158 A1 | 3/2010 | Uesaka et al. |
| 2010/0131625 A1* | 5/2010 | Dehaan ............... H04L 41/0853 709/221 |
| 2010/0231160 A1 | 9/2010 | Shaffer et al. |
| 2011/0204717 A1 | 8/2011 | Shaffer |
| 2012/0155475 A1 | 6/2012 | Vasseur et al. |
| 2013/0121175 A1 | 5/2013 | Carlin et al. |
| 2013/0121176 A1 | 5/2013 | Addepalli et al. |
| 2013/0218427 A1* | 8/2013 | Mukhopadhyay .... B60W 40/09 701/51 |

(Continued)

FOREIGN PATENT DOCUMENTS

| | | |
|---|---|---|
| EP | 2166777 A1 | 3/2010 |
| WO | WO-2011067555 A1 | 6/2011 |

OTHER PUBLICATIONS

Jabbar et al. Performance Comparison of Weather Disruption-Tolerant Cross-Layer Routing Algorithms. IEEE 2009.*

(Continued)

*Primary Examiner* — Bryan Lee
(74) *Attorney, Agent, or Firm* — Parker Ibrahim & Berg LLC; James M. Behmke; Stephen D. LeBarron

(57) ABSTRACT

In one embodiment, network parameters are dynamically adjusted using weather forecasts. The embodiments include determining a weather forecast that predicts a weather condition proximate to a network. Network parameters are then selected for adjustment based on the predicted weather condition. The selected network parameters are adjusted to improve performance of the network in response to the predicted weather condition.

21 Claims, 8 Drawing Sheets

(56) References Cited

U.S. PATENT DOCUMENTS

2014/0167975 A1* 6/2014 Smith ............... H04W 52/242
340/870.02

OTHER PUBLICATIONS

Piorno et al. Prediction and Management in Energy Harvested Wireless Sensor Nodes. IEEE 2009.*

Jabbar et al. Weather Disruption-Tolerant Self-Optimising Millimeter Mesh Networks. IEEE 2008.*

Vineet Srivastava. Cross-Layer Design: A Survey and the Road Ahead. IEEE Communications Magazine. Dec. 2005. pp. 112-119.*

Mundt. Adjusting the Power Consumption of a Solar Energy Powered Wireless Network Node in Accordance with Weather Forecasts. 2008.*

Mundt, Thomas, "Adjusting the Power of Consumption of a Solar Energy Powered Wireless Network Node in Accordance with Weather Forecasts", in Novel Algorithms and Techniques in Telecommunications, Automation and Industrial Electronics, pp. 537-542, Jan. 1, 2008, Springer, Netherlands, Dordrecht.

Vinci, et al., "Notification of Transmittal of the International Search Report and the Written Opinion of the International Searching Authority, or the Declaration", Sep. 4, 2014, 12 pages, Patent Cooperation Treaty, European Patent Office, Rijswijk, Netherlands.

Jabbar, et al., "Performance Comparison of Weather Disruption-Tolerant Cross-Layer Routing Algorithms", Proceedings of the 28th IEEE Conference on Computer Communications (INFOCOM 2009), Apr. 2009, pp. 1143-1151, IEEE, Rio de Janeiro, Brazil.

Li, et al., "Weather Forecasting—Predicting Performance for Streaming Video Over Wireless LANs", NOSSDAV '05, Jun. 2005, 6 pages, ACM, Stevenson, WA.

Sharma, et al., "Cloudy Computing: Leveraging Weather Forecasts in Energy Harvesting Sensor Systems", 7th Annual IEEE Commhnications Society Conference on Sensor Mesh and Ad Hoc Communications and Networks (SECON), Jun. 2010, 9 pages, Boston, MA.

Winter, et al., "RPL: IPv6 Routing Protocol for Low-Power and Lossy Networks", Request for Comments 6550, Mar. 2012, 157 pages, Internet Engineering Task Force Trust.

* cited by examiner

| NETWORK PROFILE 304 | POWER OUTAGE NOTIFICATION 404 | METER CHECKING 406 | ENERGY HARVESTING DEPENDENT 408 |
|---|---|---|---|
| PROFILE A | • HIGH TRAFFIC PRIORITY<br>• LOW LATENCY TRANSMISSION REQUIREMENT<br>• INCREASED BROADCAST COMMUNICATION CAPACITY<br><br>410 | • LOW TRAFFIC PRIORITY<br>• HIGH LATENCY TRANSMISSION PERMITTED<br>• SUSPENDED TRANSMISSION AND/OR DROPPED PACKETS<br><br>412 | • REDUCED ENERGY RESOURCES AVAILABLE<br>• REDUCED NETWORK TRAFFIC<br><br>414 |
| PROFILE B | ... | ... | ... |
| PROFILE C | ... | ... | ... |

FIG. 4

| TIME OF DAY 502 | WEATHER CONDITION 302 | NETWORK PROFILE 304 |
|---|---|---|
| 6:01AM - 8:00AM | FOGGY | PROFILE B |
| 8:01AM - 11:30AM | RAINY | PROFILE A |
| 11:31AM - 6:30PM | SUNNY | PROFILE C |

FIG. 5

DYNAMICALLY ADJUSTING NETWORK PARAMETERS USING WEATHER FORECASTS

TECHNICAL FIELD

The present disclosure relates generally to computer networks, and, more particularly, to dynamically adjusting network parameters using weather forecasts.

BACKGROUND

Low power and lossy networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. Frequently, LLNs are deployed in outdoor environments that can span large geographical areas. As such, the weather may affect the behavior of an application within an LLN. For example, in Smart Grid Advanced Metering Infrastructure (AMI) networks, a common network application involves reporting power outages. The traffic profile for sending Power Outage Notifications (PONs) is quite different from typical traffic, such as meter reading. In particular, PONs utilize broadcast communication on the first hop, hop-by-hop duplicate suppression and aggregation, and require low-latency forwarding. Because power outages are most likely to occur during periods of inclement weather, the active application traffic profiles, as well as the network demands, may vary significantly based on the weather condition to which the LLN is subjected.

BRIEF DESCRIPTION OF THE DRAWINGS

The foregoing and other objects, features, aspects and advantages of the embodiments disclosed herein will become more apparent from the following detailed description when taken in conjunction with the following accompanying drawings.

FIG. 4 illustrates an example network profile table, in which network profiles are mapped against network applications.

FIG. 5 illustrates an example network profile table, in which network profiles are mapped against weather conditions and time of day indicators.

Figure 1:
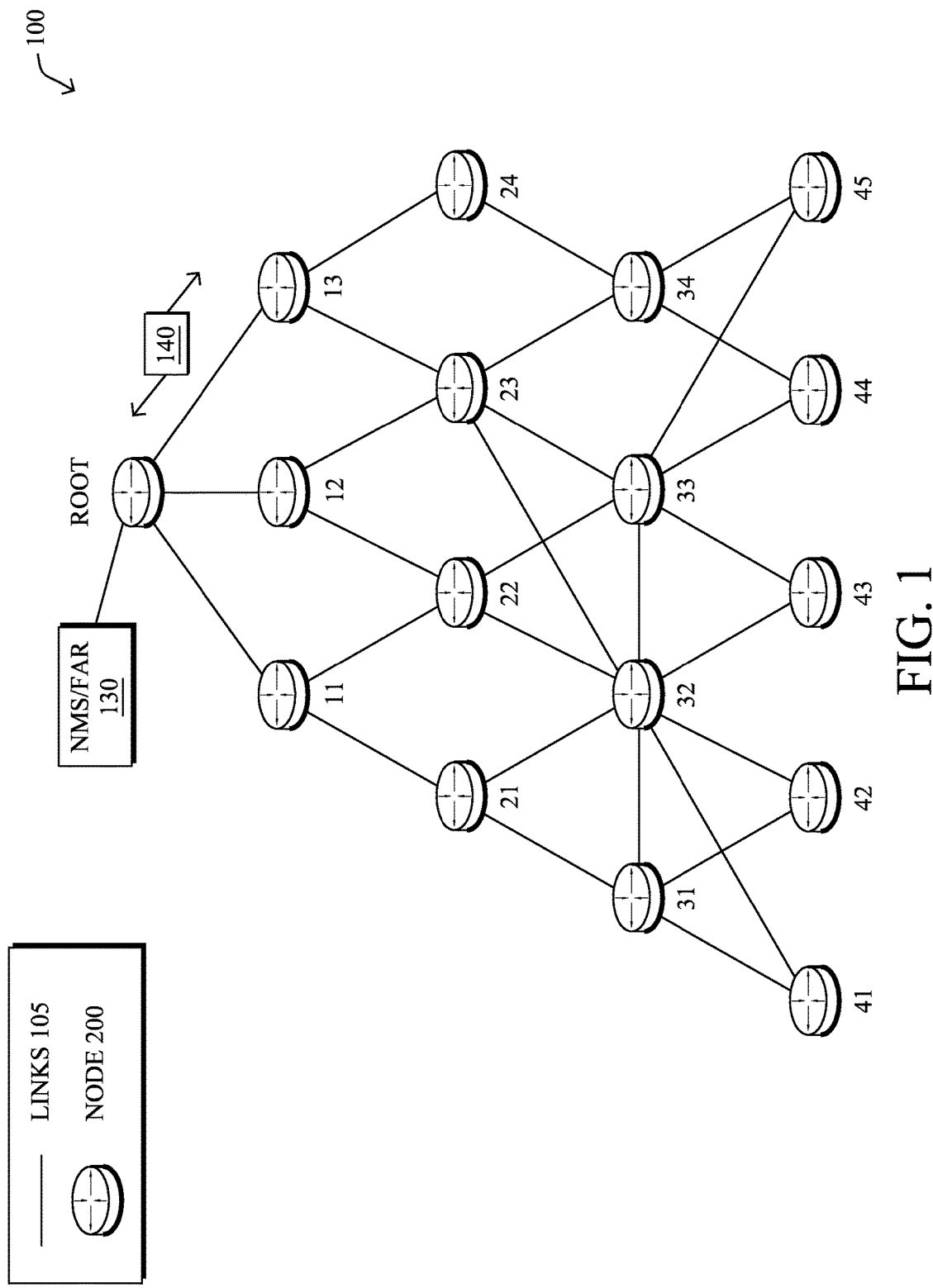
FIG. 1 illustrates an example communication network.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF EXAMPLE EMBODIMENTS

Overview

According to the disclosed embodiments, network parameters are dynamically adjusted using weather forecasts. The embodiments illustratively include determining a weather forecast that predicts a weather condition proximate to a network. Network parameters are then selected for adjustment based on the predicted weather condition. The selected network parameters may then be adjusted to improve performance of the network in response to the predicted weather condition.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communication links located in the same general physical location, such as a building or campus. WANs, on the other hand, typically connect geographically dispersed nodes over long-distance communication links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100. Illustratively, computer network 100 comprises nodes 200 (e.g., labeled as shown, "root," "11," "12," . . . "45," and described in FIG. 2 below) interconnected by communication links 105. For instance, the links 105 may be wired links or shared media (e.g., wireless links, PLC links, etc.) where certain nodes 200, such as routers, sensors, computers, actuators, and the like, may be in communication with other nodes 200, e.g., based on distance, signal strength, current operational status, location, and the like. A network management server (NMS) 130 be in communication with a "root" node (e.g., a field area router, "FAR") in the illustrated computer network. The NMS may be of any suitable type for centralized network management, and may be connected directly to the root/FAR (e.g., a plurality), or may be connected via a WAN, cellular network, etc. For the purposes of the present disclosure, the computer network 100 may be of any suitable type of network, including, but not limited to, an LLN.

Those skilled in the art will understand that any number of nodes, devices, links, etc. may be used in a computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes 200 of the computer network 100 using predefined network communication protocols such as certain known wired protocols, wireless protocols (e.g., IEEE Std. 802.15.4, WiFi, Bluetooth®, etc.), LLN protocols, PLC protocols, or other shared-media protocols where appropriate. In this context, a protocol consists of a set of rules defining how the nodes interact with each other.

Figure 2:
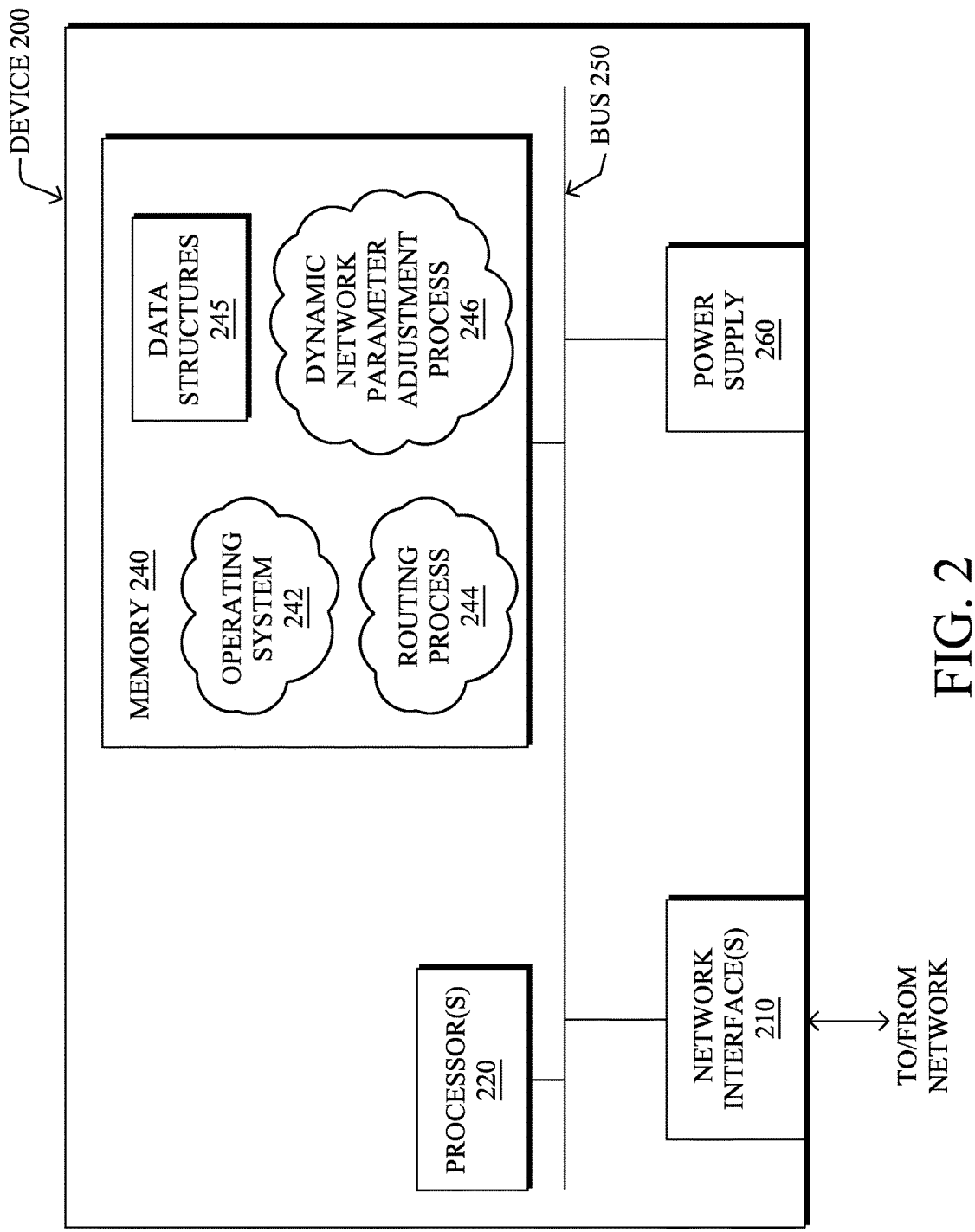
FIG. 2 illustrates an example network device/node.

FIG. 2 is a schematic block diagram of an example node 200 that may be used with the embodiments described herein. The node 200 may be used as any of the nodes shown in FIG. 1. As described above, the node 200 may be of any suitable type, including routers, sensors, computers, actuators, and the like. The device may comprise one or more network interfaces 210 (e.g., wireless/channel-hopping), one or more processors 220, a memory 240, and a power supply 260 (e.g., plug-in, battery, etc.), interconnected by a system bus 250.

The network interface(s) 210 contain the mechanical, electrical, and signaling circuitry for communicating data over links 105 coupled to the network 100. The network interfaces 210 may be configured to transmit and/or receive data using a variety of different communication protocols. Moreover, the nodes 200 may have multiple different types of network interfaces 210, e.g., wireless and wired/physical connections, and that the view herein is merely for illustration. Alternatively, while the network interface 210 is shown separately from power supply 260, the network interface 210 may communicate through the power supply 260, or may be an integral component of the power supply.

The memory 240 comprises a plurality of storage locations that are addressable by the processor(s) 220 and the network interface(s) 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise, at least, routing process/services 244, as well as dynamic network parameter adjustment process 246, as described in further detail herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, for example, data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR).

Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Moreover, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" (or "Internet of Everything") network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads" or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

As noted above, due to their underlying attributes, LLNs face a number of challenges. For example, LLNs are a class of network in which both the routers and their interconnect are "constrained." This means that LLN routers typically operate with constraints, e.g., processing power, memory, and/or energy (e.g., batteries). Also, their interconnects are characterized by, for example, high loss rates, low data rates, and/or instability.

Additionally, LLNs communicate over a physical medium that is strongly affected by environmental conditions that change over time. Some examples include temporal changes in interference (e.g., other wireless networks or electrical appliances), physical obstruction (e.g., doors opening/closing or seasonal changes in foliage density of trees), and propagation characteristics of the physical media (e.g., temperature or humidity changes). The time scales of such temporal changes can range between milliseconds (e.g., transmissions from other transceivers) to months (e.g., seasonal changes of outdoor environment).

Moreover, low-cost and low-power designs limit the capabilities of the transceiver. In particular, LLN transceivers typically provide low throughput and typically support limited link margin. Therefore, the effects of interference and environmental changes to LLNs are visible to link and network protocols.

When using wireless transceivers, the devices must communicate across a medium that is exposed and vulnerable to environmental conditions. As a result, the environment can significantly affect the communication medium. For example, daily variation in humidity can significantly affect the effective range of wireless communication. In particular, a daily variation of 10 dB is possible depending on whether the air is clear or there is heavy fog. Similar effects may be observed during heavy rains or snow.

Similarly, when using energy harvesting sources (e.g., solar power) to power a device, the weather can affect the energy resources available to the device. For example, a cloudy day provides less solar energy than a sunny day. Consequently, devices may not be able to utilize as much energy on days that are cloudy or foggy. Furthermore, the specific times at which the sun may be occluded can affect different devices in different ways depending on how each device is deployed.

In yet another example, as noted above, a common network application in Smart Grid AMI networks involves reporting power outages. The traffic profile for sending Power Outage Notifications (PONs) is quite different from typical traffic, such as meter reading. In particular, PONs utilize broadcast communication on the first hop, hop-by-hop duplicate suppression and aggregation, and require low-latency forwarding. Because power outages are most likely to occur during periods of inclement weather, the active application traffic profiles, as well as the network demands, may vary significantly based on the weather condition to which the LLN is subjected.

Dynamic Adjustment of Network Parameters Using Weather Forecasts

The techniques herein optimize network performance by taking into account weather forecasts and application requirements. While LLN protocols are designed to adapt to changing conditions, using weather forecasts allows the network to optimize its operation before changes in weather conditions, and allows any changes to occur smoothly over a larger time period. As such, weather forecasts provide ample lead-time to alter network parameters or behaviors and increase overall network performance.

In particular, the techniques herein use the weather forecast to dynamically adjust network parameters and behavior. The weather forecast may affect application traffic profiles, link characteristics, and energy resources. Using the weather forecast allows the system to adjust link-layer parameters (e.g., broadcast vs. unicast capacity, link margin thresholds, low-pass filter weighting factors, low-power listening periods, etc.) and network-layer parameters (e.g., building additional directed acyclic graphs (DAGs), applying battery backup unit (BBU) constraints to routes, filtering specific application traffic, etc.). The weather forecasts/traffic profiles may be provided by an NMS or FAR. LLN devices may provide their capabilities to the NMS/FAR to assist in adjusting parameters. The NMS/FAR/LLN devices may utilize feedback on network performance to fine-tune network parameter selection when similar weather conditions occur in the future.

Illustratively, the techniques described herein may be performed by hardware, software, and/or firmware, such as in accordance with the network parameter adjustment process 246, which may contain computer executable instructions executed by the processor(s) 220 (or an independent processor of network interface(s) 210) to perform functions relating to the techniques described herein, e.g., in conjunction with routing process 244, as depicted in FIG. 2. The techniques described herein may be processed by similar components that are understood in the art to be operable to dynamically adjust network parameters.

Operationally, the techniques herein generally relate to, but are not limited to, for example, building application traffic profiles and/or application requirements for various weather conditions, adjusting link-layer and network-layer parameters based on the weather forecast and expected application profile, using the weather forecast to predict future energy resources and adjust parameters based on the available resources, transmitting/receiving a message to adjust the parameters in network devices based on the weather forecast, and using a feedback loop to fine-tune network parameter selection for different weather conditions.

Figure 3:
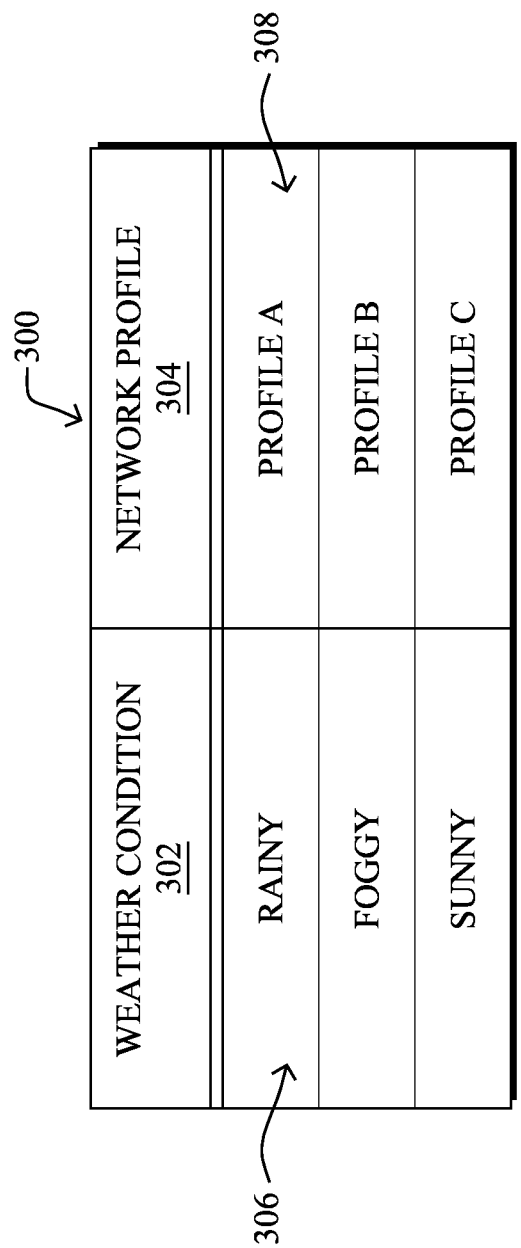
FIG. 3 illustrates an example network profile table, in which network profiles are mapped against weather conditions.

FIG. 3 illustrates an example network profile table, in which network profiles are mapped against weather conditions. As shown in FIG. 3, the network profile table 300 comprises weather condition field 302 containing weather conditions 306, and network profile field 304 containing network profiles 308.

As explained above, the disclosed embodiments comprise determining a weather forecast that predicts a weather condition proximate to a network, selecting network parameters of the network to adjust based on the predicted weather condition, and adjusting the network parameters to improve performance of the network in response to the predicted weather condition. One manner in which network parameters to adjust may be selected involves network profiles. In particular, a plurality of network profiles that define attributes of the network and correspond to a plurality of weather conditions respectively may be determined. Upon receiving the predicted weather condition, the network profile that corresponds to the predicted weather condition may be selected. The selecting of network parameters may then be based on the selected network profile.

In this regard, the network profile table 300 maps a plurality of weather conditions 306 against a plurality of network profiles 308 respectively. The mapping effectively provides weather condition/network profile pairs, such that each weather condition 306 corresponds to a single network profile 308. The network profile table 300 may be pre-populated and/or altered over time, e.g., entries may be dynamically added, removed, edited, etc. For example, the network profile table 300 may be altered according to obtained feedback so as to fine-tune network parameter selection, as discussed in further detail below. As a more specific example, feedback obtained by the NMS/FAR 130 may indicate that an application traffic profile of a given network profile 308, which corresponds to a given weather condition 306, could be improved; therefore, the application traffic profile of the given network profile 308 may be adjusted so as to improve the efficacy of the network optimization upon the occurrence of the given weather condition 306.

The network profile table 300 may be determined by the NMS/FAR 130 or the like. The network profile table 300 may be stored in memory 240 of a given node. The network profile table 300 may be managed using any suitable database management system. Further, the network profile table 300 may be stored externally, and accessed by a given node, such as the NMS/FAR 130. In the alternative, the network profile table 300, and the information therein, may exist only conceptually. In other words, network parameters to be adjusted may be selected based on the predicted weather condition and/or the selected network profile without actual formation of the network profile table 300 in memory 240, or otherwise. Thus, the network profile table 300 is merely intended for the purpose of better understanding the present disclosure.

The weather condition field 302 may contain entries for weather conditions 306. Illustratively, the weather conditions 306 may include, for example, "rainy," "foggy," "sunny," and the like. It is understood that the weather conditions 306 may be of any suitable type of weather, further including "inclement," "optimal," "unknown," etc. The weather condition field 302 and the entries therein may be pre-populated and/or altered over time, e.g., entries may be dynamically added, removed, edited, etc. The weather conditions 306 correspond to environmental conditions to which a network may be exposed. Upon receiving a weather forecast at a given node, such as the NMS/FAR 130, a weather condition 306 that corresponds to a weather condition predicted by the received weather forecast may be determined from the network profile table 300. Moreover, the network profile 308 that corresponds to the determined weather condition 306 may be determined, and one or more nodes of the computer network 100 may be adjusted accordingly.

The network profile field 304 may contain entries for network profiles 308. Examples of network profiles 308 may include, for example, "Profile A," "Profile B," "Profile C," and the like. Any suitable naming convention may be utilized. Each network profile 308 is mapped in the network profile table 300 so as to correspond to a single weather condition 306. The one-to-one mapping convention means that during a particular weather condition, a network, e.g., computer network 100, should perform according to the network profile that corresponds to the particular weather condition. Illustratively, the network profiles 308, i.e., "Profile A," "Profile B," and "Profile C" correspond to the weather conditions 306, i.e., "rainy," "foggy," and "sunny" respectively.

The network profiles 308 define attributes of the network, i.e., metrics for indicating a performance of a computer network, at a particular time, as discussed in further detail below. For the purposes of this disclosure, in an exemplary embodiment, the "particular time" refers to a time at which a particular weather condition occurs; however, the particular time at which a network profile 308 is applicable may alternatively correspond to, for example, a time of day, a month, a season, etc. The network attributes may include any suitable metric for determining network performance, including, but not limited to, application traffic profiles, application usage requirements, link margin thresholds, energy harvesting application resource availability, application demands, node or link stability, and the like. Thus, the network profiles 308 represent an indication of the attributes, e.g., performance/condition, of the respective network, e.g., computer network 100, at a particular time.

In addition, the network profiles 308 may simply define a plurality of network parameters to adjust. Thus, a network profile may be selected based on the predicted weather condition, thereby facilitating the selection of network parameters for adjustment to optimize the network.

As would be understood to a person of ordinary skill in the art, determining the attributes of the network at a particular time confers various advantages, such as being able to optimize the network in response to a weather condition. Moreover, determining the attributes of the network at a particular time in the future allows for network optimization to occur proactively, i.e., prior to the occurrence of the determined weather condition. The proactive adjustments to the network allows for any changes to occur smoothly over a larger time period.

FIG. 4 illustrates an example network profile table, in which network profiles are mapped against network applications. As shown in FIG. 4, the network profile table 400 comprises network profile field 304 containing network profiles 308, applications field 402 containing applications 404, 406, and 408, and application profiles 410, 412, and 414.

The network profile table 400 maps a plurality of application profiles 410, 412, and 414 against the network profiles 308, such that the application profiles 410, 412, and 414 correspond to a single network profile 308. The network profile table 400 may be stored, populated, managed, and/or accessed in the same manner as network profile table 300, as described in detail above. In the alternative, the network profile table 400, and the information therein, may exist only conceptually. In other words, network parameters to be adjusted may be selected based on the predicted weather condition and/or the selected network profile without actual formation of the network profile table 400 in memory 240, or otherwise. Thus, the network profile table 400 is merely intended for the purpose of better understanding the present disclosure.

The network profile field 304 contains entries for network profiles 308. Examples of network profiles 308 may include, for example, "Profile A," "Profile B," "Profile C," and the like. Any suitable naming convention may be utilized. Each network profile 308 is mapped in the network profile table 304 so as to correspond to an application profile 410, 412, and 414, of each application 404, 406, and 408, respectively. The "one-to-many" mapping convention means that a given network profile defines each application profile with which it is associated.

As described above, the network profiles 308 correspond to the weather conditions 306. Thus, it is understood that the application profiles 410, 412, and 414, which correspond to a network profile 308, also correspond to a weather condition 306. For example, as illustrated in FIG. 3, the network profile "Profile A" corresponds to the weather condition "rainy." Therefore, the application profiles 410, 412, and 414, which illustratively correspond to network profile "Profile A," also correspond to the weather condition "rainy." In other words, under rainy weather conditions, the applications 404, 406, and 408 may perform in the manner as defined by application profiles 410, 412, and 414 respectively.

The applications field 402 may contain entries for applications 404, 406, and 408. Illustratively, applications 404, 406, and 408 represent applications operating on a network, e.g., computer network 100. In particular, FIG. 4 depicts network applications "Power Outage Notification" 404, "Meter Checking" 406, and "Energy Harvesting Dependent" 408. However, it is understood that a network, e.g., computer network 100, may contain any number of applications. In this regard, a typical LLN contains a vast number of varied applications operating thereon. Thus, applications 404, 406, and 408 are illustrated as a mere simplified example of the disclosure, and should not be interpreted as limiting the disclosure.

The applications 404, 406, and 408 correspond to the application profiles 410, 412, and 414 respectively. The application profiles 410, 412, and 414 represent attributes of the applications 404, 406, and 408 respectively, at a particular time. For the purposes of this disclosure, in an exemplary embodiment, a "particular time" refers to a time at which a particular weather condition occurs; however, the particular time at which the application profiles 410, 412, and 414 are applicable may alternatively correspond to, for example, a time of day, a month, a season, etc. Thus, when considered conjunctively, the application profiles 410, 412, and 414 may be considered as defining attributes of the network 100 on which the applications 404, 406, and 408 operate, at a time at which a particular weather condition occurs. As such, the attributes of the network 100 at a particular time in the future may be predicted based on a forecasted weather condition and the corresponding application profiles 410, 412, and 414.

The attributes of the applications 404, 406, and 408, as defined by the application profiles 410, 412, and 414, may be represented by any metric that measures the performance, activity, and/or demands of those applications. For example, such metrics may include, but are not limited to, traffic profiles, usage requirements, external device demands, propagation integrity, latency, unicast/broadcast communication, signal interference, link characteristics (e.g., link margin, link stability, etc.), application priority, energy resource availability, type of power source, low-pass filter weighting factors, low-power listening periods, etc. Illustratively, the application profiles 410, 412, and 414 represent the attributes of the applications "Power Outage Notification" 404, "Meter Checking" 406, and "Energy Harvesting Dependent" 408 respectively. The application profiles 410, 412, and 414 correspond to a single network profile 308, e.g., "Profile A," and, as a result, correspond to a single weather condition 306, e.g., "rainy." Therefore, illustratively, the application profile 410 for application "Power Outage Notification" 404 corresponds to the network profile "Profile A" and the weather condition "rainy." In other words, the application profile 410 defines attributes of the "Power Outage Notification" application, the application profile 412 defines attributes of the "Meter Checking" application, and the application profile 414 defines attributes of the "Energy Harvesting Dependent" application, all of which under rainy weather conditions.

As an example, under sunny, i.e., normal/optimal, weather conditions, the dominant traffic in a Smart Grid AMI network may stem from the "Meter Checking" application 406, which may transmit meter reads at regular intervals throughout the day. In such cases, the meter reads must achieve near 100% reliability within 30 minutes of operation. However, when a power outage event occurs, the Power Outage Notifications (PONs) are much more important and dropping meter reads in order to maintain robust and low-latency PONs is typically acceptable. Therefore, under rainy, i.e., inclement, weather conditions, activity from the "Power Outage Notification" application 404 should increase, as the network is significantly more likely to transport PONs, as well as Power Restoration Notifications (PRNs). The end-user may wish to suspend periodic meter reads when inclement weather is expected, providing more capacity to PONs and PRNs. Doing so may simply consist of instructing the head-end to stop making requests. However, this may also involve instructing LLN devices to simply drop packets or only allow traffic for PON-related applications, which may be identified using different Traffic Class markings or through Deep Packet Inspection.

Moreover, under foggy or cloudy weather conditions, the "Energy Harvesting Dependent" application 408 may not be able to utilize as much energy as usual, as a cloudy day provides less solar energy than a sunny day. Under such conditions, the application, or the NMS/FAR, may use this information to formulate an energy budget and to determine what parameter adjustments to make, if any. For example, the application may reduce its rate for reporting messages to an NMS or application server. Alternatively, the application may increase the period between link-layer channel-samples to decrease listen duty-cycles at the expense of increasing communication latency. The application may also use the weather forecast to dynamically switch between operating as a router or edge device.

The above attributes, which are typically application-specific and weather-dependent, may be indicated in the application profiles 410, 412, and 414. The attributes may be utilized by a network device, e.g., the NMS/FAR, to make an informed decision as to which network parameters to select for adjustment, in order to optimize the network in response to the predicted weather condition.

For example, as illustrated in FIG. 4, the application profile 410 indicates attributes of the "Power Outage Notification" application 404 under rainy weather conditions, including: high traffic priority; low latency transmission requirement; and increased broadcast communication capacity requirement. The application profile 412 indicates attributes of the "Meter Checking" application 406 under rainy weather conditions, including: low traffic priority; high latency transmission permitted; and suspended transmission and/or dropped packets permitted. The application profile 414 indicates attributes of the "Energy Harvesting Dependent" application 408 under rainy weather conditions, including: reduced energy resources available; and reduced network traffic. It should be understood that the illustrated attributes are provided merely as a simplified example for better understanding the disclosure. As would be recognized by one of ordinary skill in the art, the application profiles may contain any number and variety of attributes. Thus, the contents of FIG. 4 should not be considered limiting.

FIG. 5 illustrates an example network profile table, in which network profiles are mapped against weather conditions and time of day indicators. As shown in FIG. 5, the network profile table 500 comprises weather condition field 302 containing weather conditions 306, network profile field 304 containing network profiles 308, and time of day field 502 containing time periods 504.

The NMS/FAR of the network 100 may choose to disseminate a network profile according to different time periods. A run-length approach may be used to apply weather conditions 306 and/or network profiles 308 to different time durations. For example, if the weather is not expected to change much for X hours, then the profile would specify "X hours" along with the corresponding weather condition and/or network profile.

The network profile table 500 maps a network profile 308 against a weather condition 306, and maps the weather condition 306 against a time period 504. Thus, a network profile 308 that corresponds to a weather condition 306 also corresponds to a time period 504. The network profile table 500 may be stored, populated, managed, and/or accessed in the same manner as network profile tables 300 and 400, as described in detail above. In the alternative, the network profile table 500, and the information therein, may exist only conceptually. In other words, network parameters to be adjusted may be selected based on the predicted weather condition and/or the selected network profile without actual formation of the network profile table 500 in memory 240, or otherwise. Thus, the network profile table 500 is merely intended for the purpose of better understanding the present disclosure.

The time of day field 502 contains entries for time periods 504. Illustratively, time periods 504 may include, for example, "6:01 am-8:00 am," "8:01 am-11:30 am," "11:31 am-6:00 pm," etc. Any suitable duration and/or frequency may be utilized, such as, for example, hourly, daily, seasonally, etc. The time period 504 represents a time at which the corresponding weather condition 306 is predicted to occur. Such information may be based on a weather forecast, for example. The weather forecast may be received by a node 200 of the network 100, such as the NMS/FAR. Alternatively, the time period 504 may be based on regular daily variations. For example, a time period from "10:00 pm-6:00 am" may be recorded in the network profile table 500 so as to correspond to a "low light" weather condition. Further, the "10:00 pm-6:00 am" time period may be recorded in the network profile table 500 as a daily recurring entry, as available light may be limited during that time period on a daily basis.

Because a network profile 308 may correspond to a time period 504, parameters of the network 100 may be adjusted based on a network profile in accordance with the respective time period. For example, as shown in FIG. 5, at 6:01 am until 8:00 am, the parameters of the network 100 may be adjusted based on network profile "Profile B," due to the predicted foggy conditions. Then, at 8:01 am until 11:30 am, the parameters of the network 100 may be further adjusted based on network profile "Profile A," due to the predicted rainy conditions. Finally, at 11:31 am until 6:00 pm, the parameters of the network 100 may be further adjusted based on network profile "Profile A," due to the predicted sunny conditions.

Accordingly, the network parameter adjustment may effectively operate on a schedule according to the time periods 504 recorded in the time of day field 502. Such an arrangement is particularly useful on days where the fog/rain may roll in and out multiple times throughout the day. With respect to energy harvesting dependent applications, the NMS/FAR of the network 100 may obtain the weather forecast to estimate how much sun there may be at different times. This approach considers both time and weather conditions to learn the power produced by the energy harvester.

Figure 6:
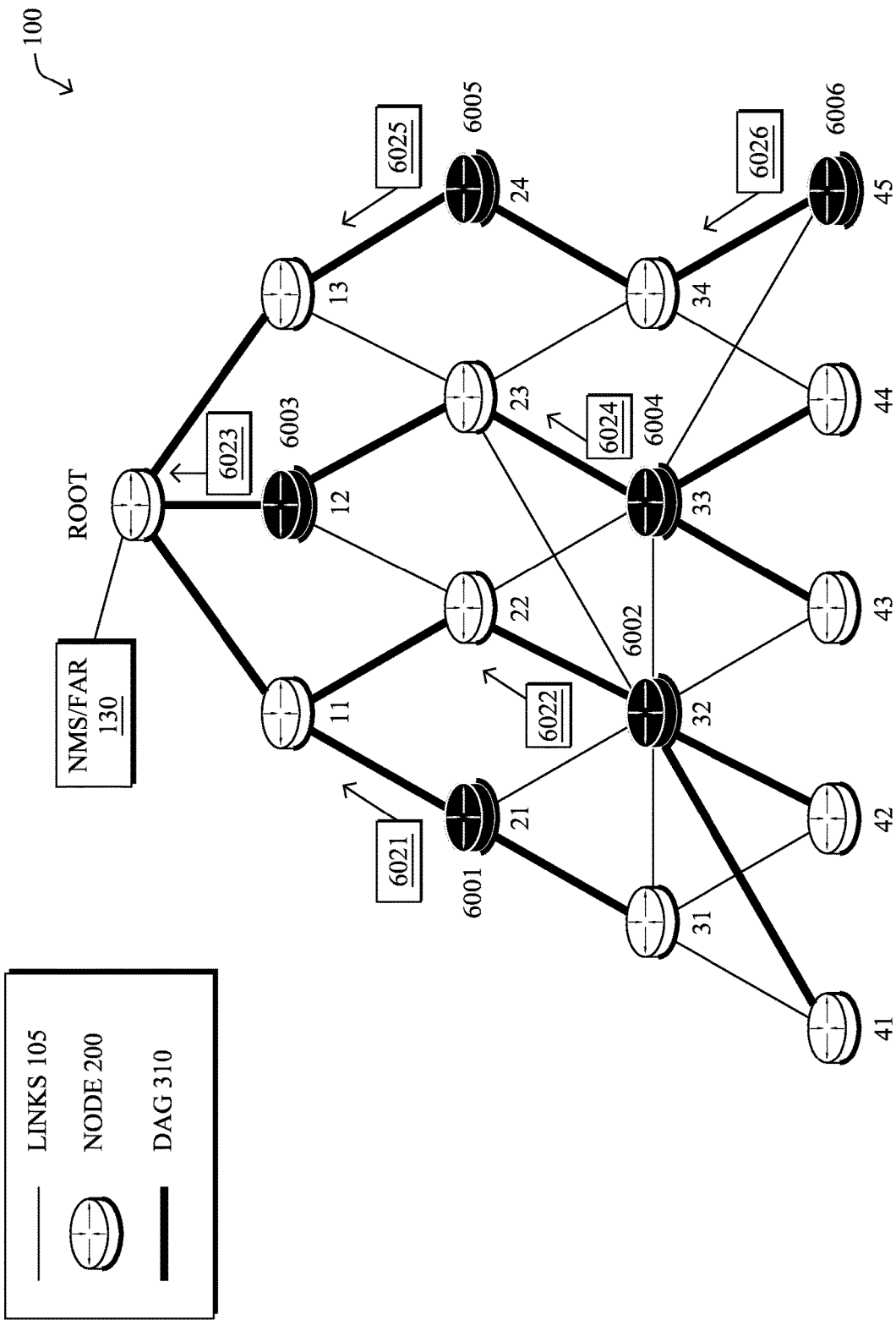
FIG. 6 illustrates an example directed acyclic graph (DAG) in the communication network, in which individual network nodes are selected for adjustment, and network attribute messages are transmitted between the network nodes.

FIG. 6 illustrates an example directed acyclic graph (DAG) in the communication network, in which individual network nodes are selected for adjustment, and network attribute messages are transmitted between the network nodes. As shown in FIG. 6, computer network 100 comprises nodes 200 (e.g., labeled as shown, "root," "11," "12," . . . "45") interconnected by links 105, as depicted in FIG. 1. Further, the network 100 comprises selected nodes 600 configured to transmit messages 602 to NMS/FAR within network 100 of FIG. 1. For instance, certain links 105 may be selected for each node to communicate with a particular parent (and thus, in the reverse, to communicate with a child, if one exists). These selected links form the DAG 610 (shown as bolded lines), which extends from the root node toward one or more leaf nodes (nodes without children). Traffic/packets 140 (shown in FIG. 1) may then traverse the DAG 610 in either the upward direction toward the root or downward toward the leaf (or host) nodes via routing nodes.

The selected nodes $600_1$-$600_6$ (hereinafter "600") represent nodes that have been selected, amongst the nodes 200, for parameter optimization. Thus, the network parameter optimization may only affect certain selected nodes, rather than every node in the network 200. Advantageously, this allows for efficient network parameter control by focusing optimization efforts on select nodes 600, rather than each and every node in the network regardless of the weather condition. The nodes 600 may be selected by the NMS/FAR. The nodes 600 may be selected based on a predicted weather condition and the corresponding network profile. For example, in the case of inclement weather, the selected nodes 600 may include meter reading applications and PON applications since inclement weather may significantly affect the performance of such applications, as explained in further detail above. In the same example, network nodes on which the inclement weather conditions have little or no impact may not be selected, as adjusting the parameters of such nodes would not be necessary to optimize the network.

The messages $602_1$-$602_6$ (hereinafter "602") transmitted by the selected nodes 600 to the NMS/FAR via links 105 are ideally in the form of data packets 140 (e.g., traffic and/or messages sent between the devices/nodes), as described above. The messages 602 may be transmitted using predefined network communication protocols such as certain known wired protocols, wireless protocols (e.g., IEEE Std. 802.15.4, WiFi, Bluetooth®, etc.), LLN protocols, PLC protocols, or other shared-media protocols where appropriate. The messages 602 may indicate the available resources/capabilities of the transmitting node and the attributes which may be affected by upcoming weather conditions. Alternatively, the messages 602 may merely indicate the available resources of the transmitting node, and the NMS/FAR 130 may determine the attributes of that node which may be affected based on the upcoming weather condition. For example, a node may send a message 602 to indicate whether it has a backup battery unit (BBU), relies on energy harvesting, or is simply main powered (e.g., "plugged in"). The NMS/FAR may utilize the transmitted information to determine what parameters are important to include in a network profile. The NMS/FAR may also use the information to help determine which node(s) require parameter adjustments and only send specific network profiles to those nodes, e.g., by selecting the nodes (using unicast when there are only a few, or multicast when there are many). Moreover, the NMS/FAR may utilize the information to determine whether it is feasible to utilize additional resources, e.g., whether it is possible to build a DAG with a constraint on utilizing only nodes with a BBU.

In addition, a node may send a message 602 to the NMS/FAR as feedback to fine-tune network parameter selection for different weather conditions. For example, the NMS/FAR may obtain network performance statistics during each weather condition, e.g., DAG stability, end-to-end latency, etc. The NMS/FAR may also receive additional input from a user/administrator based on whether the user/administrator was satisfied with the parameter(s) selected for adjustment. Alternatively, the feedback may be obtained by the NMS/FAR via any suitable network performance monitoring technique. Based on this feedback, the NMS/FAR, or even the nodes 200 themselves, can fine-tune the network parameter selection for when the same weather condition is expected to occur in the future.

Figure 7:
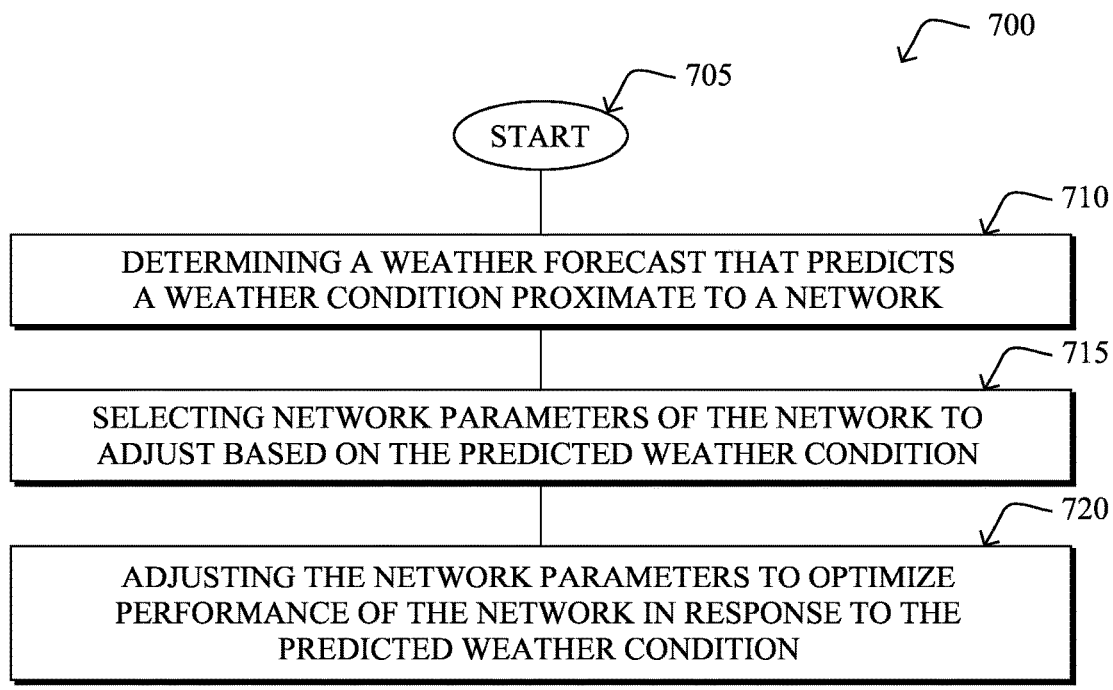
FIG. 7 illustrates an example simplified procedure for dynamically adjusting network parameters using weather forecasts.

FIG. 7 illustrates an example simplified procedure 700 for dynamically adjusting network parameters using weather forecasts. As shown in FIG. 7, the procedure 700 may start at step 705, continue to step 710, and so forth, where, as described in greater detail above, network parameters are dynamically adjusted using weather forecasts. Although FIG. 7 depicts steps in a particular order, it should be understood that the depicted embodiment is not limiting, and the particular order is depicted merely for illustration purposes.

At Step 710, the procedure 700 includes determining a weather forecast that predicts a weather condition proximate to a network. The weather forecast may be received by the NMS/FAR, or any other suitable node in the network. The weather conditions predicted by the weather forecast correspond to environmental conditions to which the network may be exposed. The weather conditions may include, for example, rainy, foggy, sunny, etc. It is understood that the weather conditions may be of any suitable type of weather, further including inclement, optimal, unknown, etc. The weather conditions may affect the performance of the network that is exposed to those conditions.

At Step 715, the procedure 700 further includes selecting network parameters of the network to adjust based on the predicted weather condition. The network attributes, which are typically application-specific and weather-dependent, may be indicated in the application profiles 410, 412, and 414. The attributes may be utilized by a network device, e.g., the NMS/FAR 130, to make an informed decision as to which network parameters to select for adjustment, in order to optimize the network in response to the predicted weather condition.

At Step 720, the procedure 700 further includes adjusting the network parameters to optimize performance of the network in response to the predicted weather condition. The network parameters may be controlled in response to the predicted weather condition before the predicted weather condition occurs. Alternatively, the network parameters may controlled during the predicted weather condition. Moreover, the NMS/FAR, or any other suitable node/device of the network, may select nodes of the network to control. In this case, the controlling of network parameters only affects the selected nodes. Even further, the NMS/FAR, or any other suitable node/device of the network, may determine a time period during which the network parameters are to be controlled. Similarly, the controlling of network parameters may be based on the predicted future energy resources of an energy harvesting device connected to the network.

Notably, the present disclosure takes into account all layers across the entire networking stack, e.g., the link layer through the application layer. As such, the controlled network parameters include parameters from a plurality of layers in the network stack. The weather can affect many layers of the stack, and a successful network optimization system method consider the entire network stack for varying weather forecasts. This is in contrast to related art methods which focus only on a single problem/layer, e.g., energy harvesting, link-state routing, etc.

For example, the controlling of network parameters may involve adjusting both link-layer and network-layer parameters, based on the predicted weather condition and the determined network profile. Regarding adjusting link-layer parameters, the weather can affect a link's propagation characteristics such as link margin and its variance. For instance, dense fog or heavy rain/snow can reduce the link margin when communicating with existing neighbors by 10 dB. On days where the fog/rain may roll in and out multiple times of the day, the link margin may vary more quickly. Also, the link-layer may react to changing weather conditions by changing the link margin threshold when accepting new neighbors to increase link stability. Moreover, the link-layer may adjust the weighting factor used in low-pass filters applied to link metrics (e.g. ETX) to trade between stability and optimality.

On the other hand, network-layer parameters may also be adjusted. As described above, the end-user may prioritize PONs and PRNs when inclement weather is expected. In this case, the end-user may allow the network stack to choose different parameters based on the different application traffic profiles/requirements. For example, because PONs and PRNs make heavy use of broadcast transmissions compared to periodic meter reads (which primarily use unicast), the network stack may choose to increase the capacity dedicated to broadcast traffic when inclement weather is expected. Further, additional DAGs may be formed at the expense of additional control traffic to provide greater path diversity in case devices unexpectedly lose power. A new DAG may be formed that places a constraint on only forming routes using devices with a BBU. Control traffic may be reduced to increase the likelihood of receiving PONs and the overall robustness of the PON system.

Figure 8:
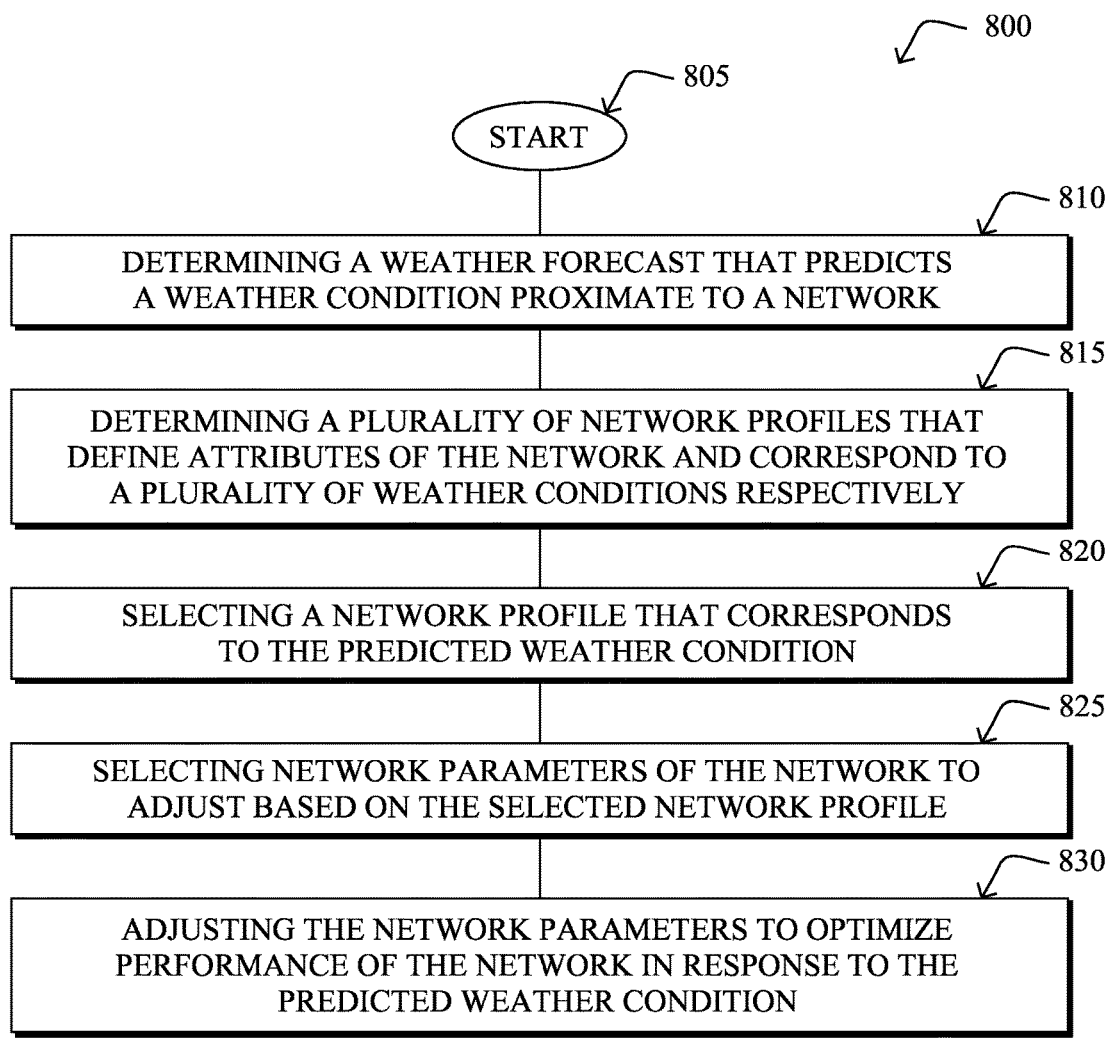
FIG. 8 illustrates another example simplified procedure for dynamically adjusting network parameters using weather forecasts.

FIG. 8 illustrates another example simplified procedure for dynamically adjusting network parameters using weather forecasts. As shown in FIG. 8, the procedure 800 may start at step 805, continue to step 810, and so forth, where, as described in greater detail above, network parameters are dynamically adjusted using weather forecasts. Although FIG. 8 depicts steps in a particular order, it should be understood that the depicted embodiment is not limiting, and the particular order is depicted merely for illustration purposes.

At Step 810, the procedure 800 includes determining a weather forecast that predicts a weather condition proximate to a network. As described above, the weather forecast may be received by the NMS/FAR, or any other suitable node in the network. The weather conditions predicted by the weather forecast correspond to environmental conditions to which the network may be exposed. The weather conditions may include, for example, rainy, foggy, sunny, etc. It is understood that the weather conditions may be of any suitable type of weather, further including inclement, optimal, unknown, etc. The weather conditions may affect the performance of the network that is exposed to those conditions.

At Step 815, the procedure 800 further includes determining a plurality of network profiles that define attributes of the network and correspond to a plurality of weather conditions respectively. The network profiles define network performance indicators, i.e., metrics for indicating a performance of a computer network, at a particular time, such as a time at which a particular weather condition occurs. The network performance indicators may include any suitable metric for determining network performance, including, but not limited to, application traffic profiles, application usage requirements, link margin thresholds, energy harvesting device resources, application demands, node or link stability, and the like. Additionally, the network profiles may be adjusted based on performance-related feedback received by, for example, the NMS/FAR. Based on this feedback, the NMS/FAR can fine-tune the network parameter selection for when the same weather condition is expected to occur in the future. The network may be of any suitable type, as referenced in detail above. Preferably, the network is a low power and lossy network (LLN).

At Step 820, the procedure 800 further includes selecting a network profile that corresponds to the predicted weather condition. The network profile may be determined by the NMS/FAR. As referenced above, a network profile table may map a plurality of weather conditions against a plurality of network profiles respectively. The mapping effectively provides weather condition/network profile pairs, such that each weather condition corresponds to a single network profile. In response to a given weather condition, the NMS/FAR, or any other suitable node/device of the network, may determine the network profile that corresponds to the given weather condition according to the recorded weather condition/network profile pairs. In addition, the NMS/FAR, or any other suitable node/device of the network, may receive a message that indicates available resources or attributes of the network that are subject to be affected by the predicted weather condition. Therefore, the network profile that is determined may be based on the available resources or attributes.

At Step 825, the procedure 800 further includes selecting network parameters of the network to adjust based on the selected network profile. The network attributes, which are typically application-specific and weather-dependent, may be indicated in the application profiles 410, 412, and 414. The attributes may be utilized by a network device, e.g., the NMS/FAR 130, to make an informed decision as to which network parameters to select for adjustment, in order to optimize the network in response to the predicted weather condition. Further, the selected network profile that corresponds to the predicted weather condition may indicate the network parameters to be selected for adjustment.

At Step 830, the procedure 800 further includes adjusting the network parameters to optimize performance of the network in response to the predicted weather condition. The network parameters may be controlled in response to the predicted weather condition before the predicted weather condition occurs. Alternatively, the network parameters may controlled during the predicted weather condition. Moreover, the NMS/FAR, or any other suitable node/device of the network, may select nodes of the network to control. In this case, the controlling of network parameters only affects the selected nodes. Even further, the NMS/FAR, or any other suitable node/device of the network, may determine a time period during which the network parameters are to be controlled. Similarly, the controlling of network parameters may be based on the predicted future energy resources of an energy harvesting device connected to the network.

As described above, the present disclosure takes into account all layers across the entire networking stack, e.g., the link layer through the application layer. As such, the controlled network parameters include parameters from a plurality of layers in the network stack.

It should be understood that the steps shown in FIGS. 7 and 8 are merely examples for illustration, and certain steps may be included or excluded as desired. Further, while a particular order of the steps is shown, this ordering is merely illustrative, and any suitable arrangement of the steps may be utilized without departing from the scope of the embodiments herein. Moreover, while procedures 700 and 800 are described separately, certain steps from each procedure may be incorporated into each other procedure, and the procedures are not meant to be mutually exclusive.

The techniques described herein, therefore, provide for dynamically adjusting network parameters using weather forecasts. In particular, the techniques herein provide a mechanism to optimize network performance based on a weather forecast. By using the weather forecast, the network may be optimized before the weather conditions change. Doing so allows any network changes to occur slowly over time. While existing network protocols, and particularly LLN protocols, are designed to adapt, they do so only after conditions change and often involve a tradeoff between adaptiveness, stability, and resource consumption. Because the performance of LLNs is typically affected by the environment itself, the weather forecast can provide important insight into the expected network conditions and behavior that is to come in the near future. Using weather forecasts helps to improve overall performance by changing network parameters to meet different application requirements.

While there have been shown and described illustrative embodiments that provide for dynamically adjusting network parameters using weather forecasts, it is to be understood that various other adaptations and modifications may be made within the spirit and scope of the embodiments herein. For example, the embodiments have been shown and described herein primarily with relation to LLN networks. However, the embodiments in their broader sense are not as limited, and may, in fact, be used with other types of networks and/or protocols.

Moreover, the foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus that comprises at least one network interface that communicates with a network, e.g., LLN, a processor coupled to the at least one network interface, and a memory configured to store program instructions executable by the processor. Further, it is expressly contemplated that the components and/or elements described herein can be implemented as software being stored on a tangible, non-transitory computer-readable medium (e.g., disks/CDs/RAM/EEPROM/etc.) having program instructions executable by a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a network management server (NMS) or a root node, a weather forecast that predicts a weather condition proximate to a network;
   determining a plurality of network profiles that define attributes of the network and correspond to a plurality of weather conditions respectively, wherein the attributes of the network include application traffic profiles and application usage requirements
   selecting, by the NMS or the root node, network parameters of the network to adjust based on the predicted weather condition and a corresponding network profile;
   selecting nodes of the network based on the predicted weather condition; and
   dynamically adjusting, by the NMS or the root node, the network parameters to improve performance of the network in response to the predicted weather condition, wherein the network parameters at at least a link layer and a network application layer across an entire networking stack are dynamically adjusted, wherein the adjusting of the network parameters only affects the selected nodes of the network.

2. The method according to claim 1,
   wherein the selecting of network parameters is based on the selected network profile.

3. The method according to claim 1, wherein the adjusted network parameters include parameters from a plurality of layers in a network stack of the network.

4. The method according to claim 1, wherein the network parameters are adjusted before the predicted weather condition occurs.

5. The method according to claim 1, further comprising:
   predicting future energy resources of an energy harvesting device connected to the network based on the predicted weather condition, wherein
   the adjusting of the network parameters is based on the predicted future energy resources.

6. The method according to claim 1, further comprising:
   receiving a message that indicates attributes of a network device that is subject to be affected by the predicted weather condition, wherein
   the adjusting of the network parameters is based on the attributes of the network device.

7. The method according to claim 1, further comprising:
   determining a time period during which the network parameters are to be adjusted, wherein
   the network parameters are adjusted during the determined time period.

8. The method according to claim 2, further comprising:
   obtaining feedback on network performance during or after a time at which the predicted weather condition occurs; and
   adjusting a network profile based on the obtained feedback.

9. The method according to claim 1, wherein the root node is a Field Area Router (FAR).

10. The method according to claim 1, wherein the network is a low power and lossy network (LLN).

11. An apparatus, comprising:
    at least one network interface that communicates with a network;
    a processor coupled to the at least one network interface and configured to execute a process; and
    a memory configured to store program instructions which contain the process executable by the processor, the process comprising:
    determining a weather forecast that predicts a weather condition proximate to the network;
    generating a plurality of network profiles that define attributes of the network and correspond to a plurality of weather conditions respectively, wherein the attributes of the network include application traffic profiles and application usage requirements;
    selecting network parameters of the network to adjust based on the predicted weather condition and a corresponding network profile;
    selecting nodes of the network based on the predicted weather condition; and
    dynamically adjusting the network parameters to improve performance of the network in response to the predicted weather condition, wherein the network parameters at at least a link layer and a network application layer across an entire networking stack are dynamically adjusted, wherein the adjusting of the network parameters only affects the selected nodes of the network, wherein the apparatus is a network management server (NMS) or a root node.

12. The apparatus according to claim 11, wherein
the selecting of network parameters is based on the selected network profile.

13. The apparatus according to claim 11, wherein the adjusted network parameters include parameters from a plurality of layers in a network stack of the network.

14. The apparatus according to claim 11, wherein the network parameters are adjusted before the predicted weather condition occurs.

15. The apparatus according to claim 11, wherein the process further comprises:
predicting future energy resources of an energy harvesting device connected to the network based on the predicted weather condition, wherein
the adjusting of the network parameters is based on the predicted future energy resources.

16. The apparatus according to claim 11, wherein the process further comprises:
receiving a message that indicates attributes of a network device that is subject to be affected by the predicted weather condition, wherein
the adjusting of the network parameters is based on the attributes of the network device.

17. The apparatus according to claim 11, wherein the process further comprises:
determining a time period during which the network parameters are to be adjusted, wherein the network parameters are adjusted during the determined time period.

18. The apparatus according to claim 12, wherein the process further comprises:
obtaining feedback on network performance during or after a time at which the predicted weather condition occurs; and
adjusting a network profile based on the obtained feedback.

19. The apparatus according to claim 11, wherein the root node is a Field Area Router (FAR).

20. The apparatus according to claim 11, wherein the network is a low power and lossy network (LLN).

21. A tangible non-transitory computer readable medium storing program instructions that cause a network management server (NMS or a root node to execute a process, the process comprising:
determining, on the NMS or root node, a weather forecast that predicts a weather condition proximate to a network;
generating a plurality of network profiles that define attributes of the network and correspond to a plurality of weather conditions respectively, wherein the attributes of the network include application traffic profiles and application usage requirements;
selecting, on the NMS or the root node, network parameters of the network to adjust based on the predicted weather condition;
selecting nodes of the network based on the predicted weather condition; and
dynamically adjusting, at the NMS or the root node, the network parameters to improve performance of the network in response to the predicted weather condition, wherein the network parameters at at least a link layer and a network application layer across an entire networking stack are dynamically adjusted, wherein the adjusting of the network parameters only affects the selected nodes of the network.

* * * * *